(12) United States Patent
Diaz

(10) Patent No.: US 12,204,139 B1
(45) Date of Patent: Jan. 21, 2025

(54) LIGHTING APPARATUS WITH LIGHT PROJECTING SUBSTRATE

(71) Applicant: Friction Floors, Oak Point, TX (US)

(72) Inventor: Christopher Diaz, Oak Point, TX (US)

( * ) Notice: Subject to any disclaimer, the term of this patent is extended or adjusted under 35 U.S.C. 154(b) by 0 days.

(21) Appl. No.: 18/426,184

(22) Filed: Jan. 29, 2024

(51) Int. Cl.
*F21V 8/00* (2006.01)

(52) U.S. Cl.
CPC ......... *G02B 6/0093* (2013.01); *G02B 6/0021* (2013.01); *G02B 6/0068* (2013.01); *G02B 6/0073* (2013.01); *G02B 6/0088* (2013.01)

(58) Field of Classification Search
CPC .............................. F21V 33/006; F21V 6/0073
See application file for complete search history.

(56) References Cited

U.S. PATENT DOCUMENTS

| | | | |
|---|---|---|---|
| 3,755,663 A | 8/1973 | George | |
| 4,329,739 A | 5/1982 | Loebner | |
| 4,631,647 A | 12/1986 | Ranney | |
| 4,907,361 A | 3/1990 | Villard | |
| 10,309,640 B2 | 6/2019 | Van Herpen et al. | |
| 2008/0037284 A1* | 2/2008 | Rudisill | F21V 23/06 362/629 |
| 2019/0053653 A1 | 2/2019 | Hills et al. | |

FOREIGN PATENT DOCUMENTS

| | | |
|---|---|---|
| EP | 0323682 A1 | 12/1989 |
| EP | 0959297 A2 | 11/1999 |

* cited by examiner

*Primary Examiner* — Robert J May
(74) *Attorney, Agent, or Firm* — Brett M. Pinkus

(57) ABSTRACT

A lighting apparatus in which lighting can be placed to project from any surface of a light transmitting substrate to areas that would normally be blocked out from adjacent lighting. The light transmitting substrate can be cut to any shape and is filled entirely with programmable light to allow light to permeate from any surface desired.

13 Claims, 2 Drawing Sheets

LIGHTING APPARATUS WITH LIGHT PROJECTING SUBSTRATE

FIELD

The present invention relates to a lighting apparatus for projecting light from a substrate.

BACKGROUND

Lighting typically requires a fixture which minimizes coverage of light in a space because of the mounting point and a focal source. With conventional bulb lighting, a fixture is needed for placement and the fixture both limits the available space for mounting and inhibits light projection. With conventional LED strip lighting, there is no fixture, but the strip lighting is mounted directly on a surface of an object and can easily fall off due to poor adhesion. Light fixtures and LED strip lighting spread light until the light is dissipated completely or until the light becomes blocked by other objects, which may prevent the light from reaching certain areas and which may leave those areas mostly or completely dark.

SUMMARY

The present invention provides a lighting apparatus in which lighting can be placed to project from any surface of a light transmitting substrate to areas that would normally be blocked out from adjacent lighting. The light transmitting substrate can be cut to any shape and is filled entirely with programmable light. This allows light to permeate from any surface desired and allows for a level of customizability with light color and top design. The area which has poor light coverage becomes the medium for the lighting.

DETAILED DESCRIPTION

Embodiments of the present invention are further described in detail below with reference to the accompanying drawings and embodiments. The following examples are intended to illustrate the invention, but are not intended to limit the scope of the invention.

Figure 1:
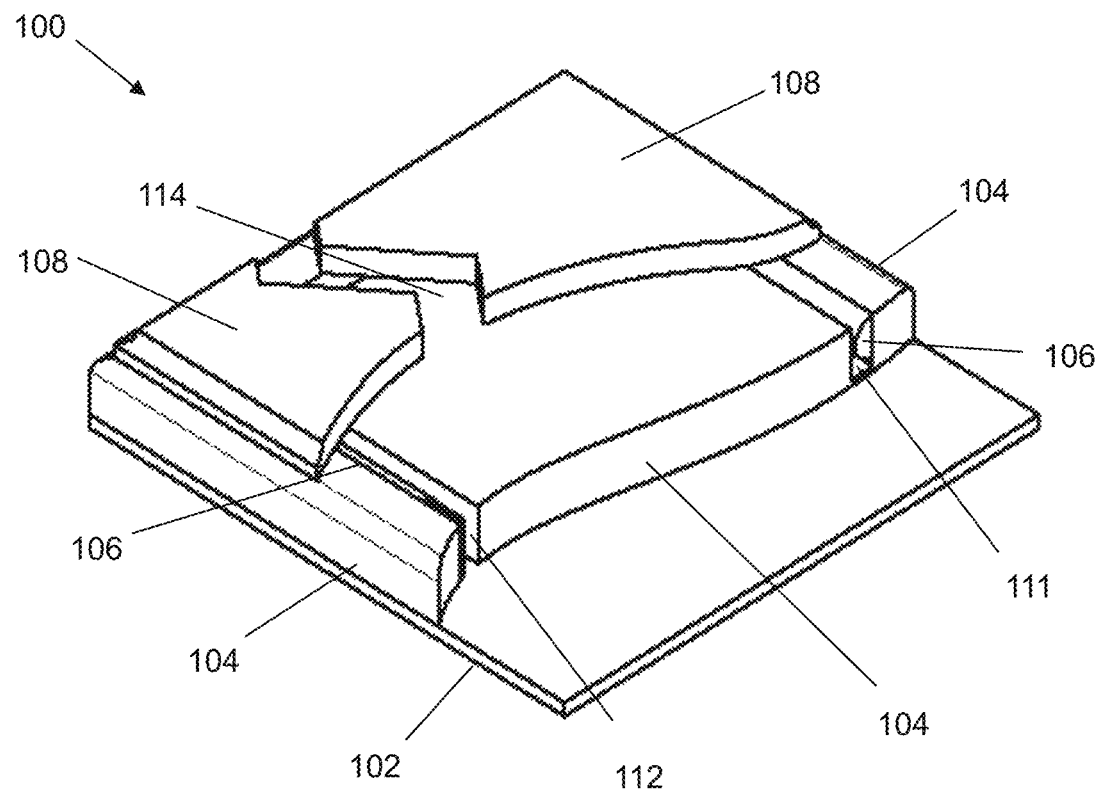
FIG. 1 is a perspective view of the lighting apparatus according to an embodiment of the present invention.
Figure 2:
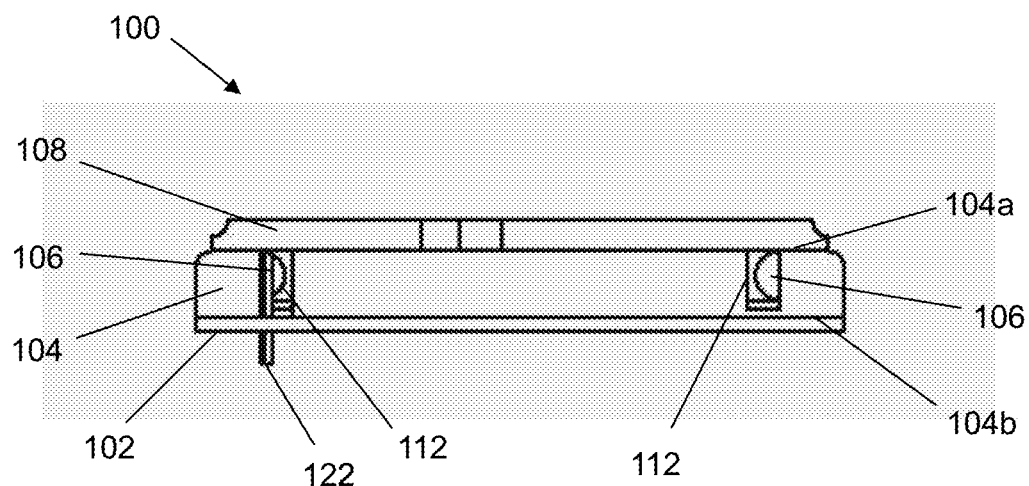
FIG. 2 is a side view of the lighting apparatus of FIG. 1 along line A-A.
Figure 3:
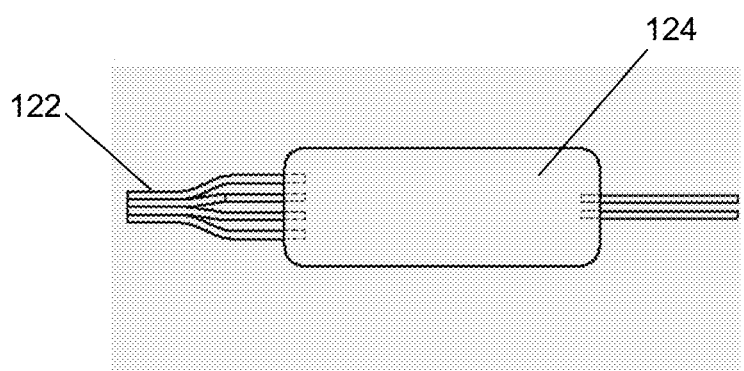
FIG. 3 is a top view of a controller for the lighting apparatus of FIG. 1 according to an embodiment of the present invention.

An embodiment of the lighting apparatus of the present invention is shown in FIGS. 1-2. The lighting apparatus may comprise a base layer 102, a light transmitting substrate 104, one or more lighting elements 106, and a protective layer 108.

In one embodiment, the base layer 102 may be a backing that is comprised of an opaque or transparent material, such plastic, wood, metal, glass, or the like. In another embodiment, the base layer 102 may comprise a surface of another object to which the lighting solution is to be applied. For example, the base layer 102 may be an exterior of an object, such as a wall of a building, cooler lid, truck bed, sign, billboard, or the like. For another example, the base layer 102 may be a flooring material, such as the interior floor or subfloor of building, vehicle, boat, airplane, or the like, or an exterior flooring material, such as a patio, deck, pool deck, driveway, walkway, street, or the like.

The substrate 104 may be a light transmitting medium comprised of clear, transparent, semi-transparent, or translucent material. For example, the substrate 104 may be comprised of a sheet of polycarbonate or acrylic material. The substrate 104 may be cut to any desired shape. One or more channels 112 may be formed within an upper surface 104a or lower surface 104b of the substrate 104. One or more lighting elements 106 may be disposed within each channel 112. The lighting elements 106 may comprise flexible strips including a plurality of LED lights. The lighting elements 106 within the substrate 104 direct light through the light transmitting medium and emit a light from the upper surface 104a of the substrate 104.

The channel 112 which contains the lighting strips can be configured in any desired orientation. Preferably, the channel 112 is formed withing the upper surface 104a of the substrate 104 to allow for easier replacement of the lighting elements 106 as may be necessary over time. Preferably, the channel 112 is between about 0.125 to 0.25 inches wide to accommodate placement the lighting elements 106.

Wiring 122 for the lighting elements 106 may be run beneath the lower surface 104b of the substrate 104 and be electronically connected to a controller 124. The controller 124 may be electrically connected to a plug-in, battery-operated and/or rechargeable power supply 126. The controller 124 may be activated to turn on or off the lighting elements 106 via a wired or wireless switch or remote control, and may also be used to control colors and lighting programs for the lighting elements 106.

The lower surface 104b of the substrate 104 may be sanded and painted. The painted lower surface 104b may match the base layer 102, which may provide an even color when light permeates the substrate 104. The painted lower surface 104b may also provide a desired color for backlighting. The painted lower surface 104b may also hide or limit the visibility of the base layer 102, the wiring 122, and the controller 124.

The substrate 104 may be adhered to the base layer 102 by a bonding agent, such as adhesive, resin, or putty. The bonding agent may be chosen to suit the nature of the installation. Preferably, the adhesive is Sikaflex® 295UV, for which it has been found to provide improved bonding to the surface of about 200 PSI of yield strength for embodiments of the present invention. In one embodiment, the substrate 104 may be fixed to the base layer 102 using a fixing means, such as screws, nails, Velcro®, or the like. In yet another embodiment, the substrate 104 may be a movable such that is not permanently affixed to the base layer 102.

The protective layer 108 may be disposed over the substrate 104 to serve to cover and seal the lighting elements 106 and protect the substrate 1104. The protective layer 108 may comprise a non-slip material that reduces slipping if it is intended to be walked on. For example, in one embodiment, the protective layer 108 may be a non-skid, high-density foam, such as EVA (Ethylene-Vinyl Acetate) foam. In another embodiment, the protective layer 108 may comprise a UV protective film that encloses the light emitted from the substrate 104. The protective layer 108 may be opaque so as to block the light emitted from the light transmitting substrate 104 or semi-transparent or translucent so as to partially obstruct the visibility therethrough or to alter the light being emitted from the light transmitting substrate.

To create the lighting apparatus, a scan is created of the area to be covered on the base layer 102. Then a CAD design is generated which may comprise the surface profile of the base layer 102 and an offset for the channel 112 inward from the surface profile. The sheet stock of the light transmitting substrate 104 may be milled to shape along with the channel 112. The shape profile may be milled to the bottom and the channel profile may be cut to a depth and width to accommodate the strip elements 106. The protective layer 108 may be cut to match the profile of the substrate 104. The substrate 104 may be affixed to the surface of the base layer 102 using the appropriate bonding agent or fixing means. The wiring 122 for the lighting elements 106 may run beneath the lower surface 104b of the substrate 104 and connected to the controller 124. The protective layer 108 may be disposed over the upper surface 104b of the substrate 104 which will serve to seal the lights and protect the light transmitting substrate 104.

This lighting apparatus of the present invention can serve to draw attention or advertise using the light transmitting medium of the substrate 104 to create a sign or label. As shown in FIG. 1, openings 114 may be milled into the protective layer 108 or the protective layer 108 can be broken into parts and arranged to create a design which allows for light to pass through. Designs may also be milled into the upper surface 104a of the substrate 104 to create condensed regions of light within the substrate 104. The lighting may draw attention to a design or logo being advertised.

The above description is only to preferred embodiments of the present invention and it should be noted that those skilled in the art can make improvements and modifications without departing from the technical principles of the present invention and as such, variations are also considered to be the scope of protection of the present invention.

What is claimed is:

1. A lighting apparatus comprising:
   a base layer having an upper surface and a lower surface;
   a light emitting substrate having an upper surface and a lower surface, wherein the lower surface of the substrate is affixed to at least a portion of the upper surface of the base layer, and wherein one or more channels are formed in the upper surface of the substrate;
   one or more lighting elements disposed within each of the one or more channels in the substrate;
   a protective layer disposed on the upper surface of the substrate, wherein at least a portion of the protective layer is disposed above the one or more channels and seals the lighting elements within the channels; and
   a controller electrically connected to the one or more lighting elements,
   wherein light from the lighting elements is transmitted from the one or more lighting elements through the substrate and which projects from at least one surface of the substrate.

2. The lighting apparatus of claim 1, wherein the one or more lighting elements comprises one or more LED light strips.

3. The lighting apparatus of claim 1, wherein the substrate is comprised of one of a clear, transparent, semi-transparent, and translucent material which allows light to project therethrough.

4. The lighting apparatus of claim 3, wherein the light emitting substrate is comprised of one of a polycarbonate or acrylic material.

5. The lighting apparatus of claim 1, wherein a lower surface of the light emitting substrate is painted.

6. The lighting apparatus of claim 1, wherein the protective layer is one of an opaque, semi-transparent, and translucent material.

7. The lighting apparatus of claim 1, wherein the protective layer includes one or more openings forming a design through which the light projected from the light emitting substrate is visible therethrough.

8. The lighting apparatus of claim 1, wherein the protective layer is comprised of one of an EVA foam or a UV protective film.

9. The lighting apparatus of claim 1, wherein a design is milled into the upper surface of the substrate to create a condensed region of light within the substrate.

10. The lighting apparatus of claim 1, wherein the light emitting substrate is affixed to the base layer with an adhesive, putty, or resin.

11. The lighting apparatus of claim 10, wherein the light emitting substrate is affixed to the base layer with an adhesive having about 200 PSI of yield strength.

12. The lighting apparatus of claim 1, wherein the controller turns on or off the lighting elements, controls a color of light emitted from the lighting elements, and controls a lighting program for the lighting elements.

13. The lighting apparatus of claim 1, wherein wiring between the lighting elements and the controller is routed between a lower surface of the substrate and an upper surface of the base layer.

* * * * *